(12) United States Patent
Suzuki et al.

(10) Patent No.: US 10,189,233 B2
(45) Date of Patent: Jan. 29, 2019

(54) METHOD FOR FIXING RESIN TUBE TO DIE AND MANUFACTURING METHOD FOR RESIN-TUBE COVERED ROLLER

(71) Applicant: CANON KABUSHIKI KAISHA, Tokyo (JP)

(72) Inventors: Takeshi Suzuki, Yokohama (JP); Yutaka Arai, Kawasaki (JP); Masaaki Takahashi, Yokohama (JP); Shigeaki Takada, Abiko (JP); Akeshi Asaka, Kashiwa (JP); Yukio Sasame, Tsukubamirai (JP); Masayuki Onuma, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 15/333,626

(22) Filed: Oct. 25, 2016

(65) Prior Publication Data
US 2017/0120568 A1 May 4, 2017

(30) Foreign Application Priority Data
Oct. 30, 2015 (JP) ................ 2015-214974

(51) Int. Cl.
| | |
|---|---|
| B32B 37/12 | (2006.01) |
| B23P 11/00 | (2006.01) |
| B23P 11/02 | (2006.01) |
| B23P 15/24 | (2006.01) |
| B29D 99/00 | (2010.01) |
| G03G 15/20 | (2006.01) |
| F16C 13/00 | (2006.01) |

(52) U.S. Cl.
CPC ...... *B32B 37/1207* (2013.01); *B29D 99/0035* (2013.01); *G03G 15/206* (2013.01); *G03G 15/2057* (2013.01); *B23P 11/00* (2013.01); *B23P 11/025* (2013.01); *B23P 15/243* (2013.01); *F16C 13/00* (2013.01)

(58) Field of Classification Search
CPC ............ B23B 37/1207; B29D 99/0035; G03G 15/2057; G03G 15/206; F16C 13/00; B23P 11/00; B23P 11/025; B23P 15/243; Y10T 29/53657; Y10T 29/53665; Y10T 29/5367; Y10T 29/536578
USPC .................................................. 29/235–238
See application file for complete search history.

(56) References Cited

FOREIGN PATENT DOCUMENTS

| | | |
|---|---|---|
| CN | 103240816 A | 8/2013 |
| JP | S52-038584 A | 3/1977 |
| JP | 03-095212 U | 9/1991 |
| JP | H03-215021 A | 9/1991 |
| JP | 05-212784 A | 8/1993 |
| JP | 05212784 A * | 8/1993 ............. B29C 55/24 |

OTHER PUBLICATIONS

Okamoto; Tube Folding Back Device; English Machine Translation; Aug. 28, 2018; pp. 1-3.*

* cited by examiner

*Primary Examiner* — Bayan Salone
(74) *Attorney, Agent, or Firm* — Canon USA, Inc. I.P. Division

(57) ABSTRACT

One end portion of a resin tube kept in a diameter expanded state by a plurality of diameter expanding claws is disengaged from the diameter expanding claws and is shifted onto an outer peripheral surface of a die by applying a pressing force toward the other end portion of the resin tube to an end surface of the one end portion of the resin tube.

4 Claims, 7 Drawing Sheets

FIG. 1A
FIG. 1B
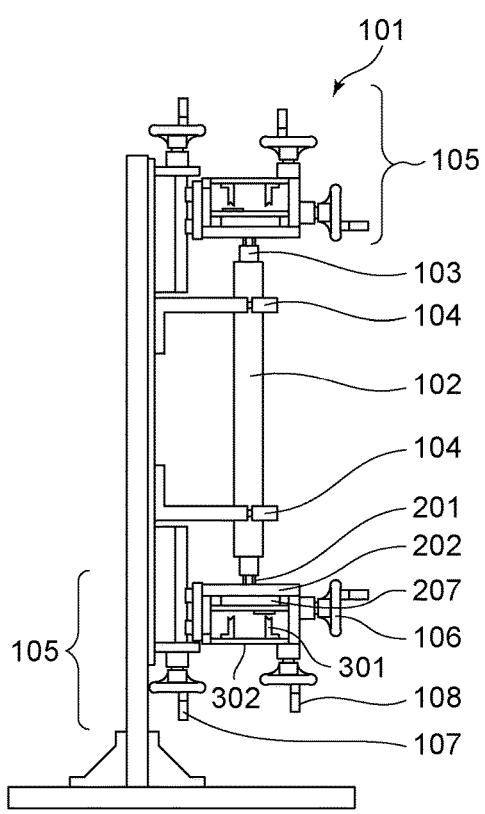
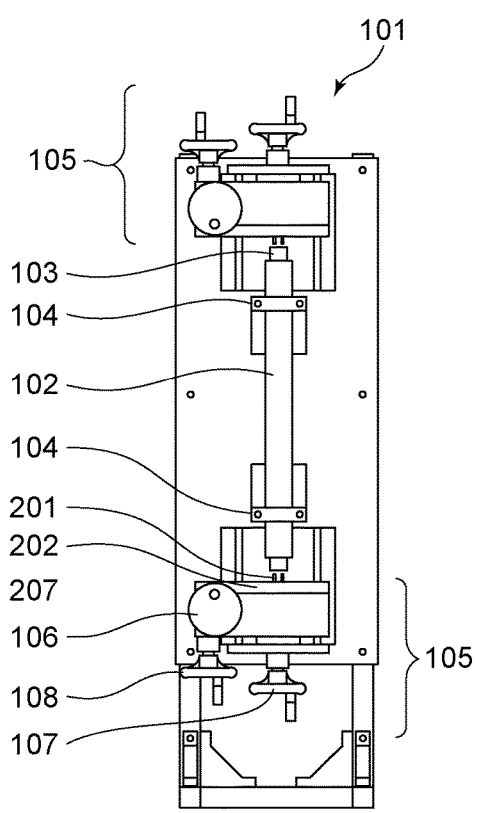

DIAMETER-REDUCED
POSITION

DIAMETER-EXPANDED
POSITION

METHOD FOR FIXING RESIN TUBE TO DIE AND MANUFACTURING METHOD FOR RESIN-TUBE COVERED ROLLER

BACKGROUND OF THE DISCLOSURE

Field of the Disclosure

The present disclosure relates to a method for fixing a resin tube to a die and a manufacturing method for a resin-tube covered roller.

Description of the Related Art

A fixing device for use in an image forming apparatus using electrophotography generally employs a roller obtained by covering a peripheral surface of a roller part, which is composed of a base formed of metal or heat-resistant resin and a single or multiple heat-resistant elastic layers stacked on the base and formed of, for example, silicone rubber, with a resin tube formed of resin such as fluorine resin (hereinafter referred to as "resin-tube covered roller").

The resin-tube covered roller can be manufactured by inserting a resin tube into a cylindrical die, folding back and fixing end portions of the resin tube protruding from both end portions of the die to the die, and pouring and curing rubber inside the die in which the resin tube is inserted.

As such a method for folding back the resin tube, Japanese Utility Model Registration Laid-Open No. 03-095212 describes a method for folding back end portions of a resin tube disposed inside a die by expanding the diameter of the end portions of the resin tube by a plurality of diameter expanding claws and advancing the diameter expanding claws along an outer peripheral surface of the die toward the center portion of the die in the diameter expanded state.

However, in the folding method described in Japanese Utility Model Registration Laid-Open No. 03-095212, the resin tube is pulled by the diameter expanding claws. Hence, a thin portion is formed in the resin tube, and distal ends of the diameter expanding claws sometimes break through the thin portion.

To address such a problem, Japanese Patent Laid-Open No. 05-212784 describes a method for folding back end portions of a resin tube by using expanding claws having rollers in their respective distal end portions. In this method, the resin tube is folded back onto outer peripheries of end portions of a pipe by advancing the expanding claws while rolling the rollers in contact with an inner surface of each end portion of the resin tube.

SUMMARY OF THE DISCLOSURE

One aspect of the present disclosure is directed to providing a method for fixing a resin tube to a die, which can suppress deviation of the resin tube during a fixing process of the resin tube.

Another aspect of the present disclosure is directed to providing a manufacturing method for a resin-tube covered roller.

According to an aspect of the present disclosure, there is provided a method for fixing a resin tube inserted in a cylindrical die to the die. The method includes (a) placing the resin tube inside the cylindrical die so that both end portions of the resin tube protrude from both ends of the die, and (b) folding back the end portions of the resin tube protruding from the both ends of the die onto an outer peripheral surface of the die. Step (b) includes the following steps (i), (ii), and (iii):

(i) providing a diameter expanding unit having a plurality of diameter expanding claws which are movable in a radial direction between a diameter reduced position to be insertable in the resin tube and a diameter expanded position to extend the resin tube so that an inner diameter of the resin tube is larger than an outer diameter of the die, and which extend in an axial direction orthogonal to the radial direction; placing the diameter expanding unit so that the axial direction is substantially parallel to a center axis of the die; inserting the diameter expanding claws at the diameter reduced position into one end portion of the resin tube protruding from one of the ends of the die; and moving the diameter expanding claws to the diameter expanded position to expand a diameter of the one end portion of the resin tube so that an inner diameter of the one end portion is larger than the outer diameter of the die;

(ii) moving the diameter expanding unit and the die relative to each other so that the diameter expanding unit approaches the other end portion of the resin tube while keeping the one end portion of the resin tube in a diameter expanded state by the diameter expanding claws; and (iii) applying a pressing force toward the other end portion of the resin tube to an end surface of the one end portion of the resin tube, disengaging the one end portion of the resin tube kept in the diameter expanded state by the diameter expanding claws from the diameter expanding claws, and shifting the one end portion of the resin tube onto the outer peripheral surface of the die.

Further features of the present disclosure will become apparent from the following description of exemplary embodiments with reference to the attached drawings.

BRIEF DESCRIPTION OF THE DRAWINGS

FIGS. 1A and 1B are a schematic side view and a schematic front view, respectively, of an example of a resin-tube fixing device.

DESCRIPTION OF THE EMBODIMENTS

Figure 2A:
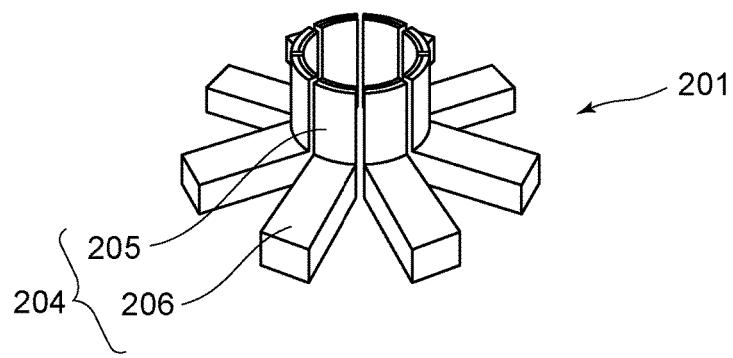
FIG. 2A is an explanatory perspective view of an example of diameter expanding members.

The present inventors examined the folding method described in Japanese Patent Laid-Open No. 05-212784, and found that the resin tube inside the die was extended by advancing operation of the expanding claws and that this sometimes caused deviation of the position of the resin tube inside the die. In this case, a surface of the resin tube may be scratched by rubbing against the die, and the scratch is considered to be caused by a deviation of the resin tube during a fixing process of the resin tube to the die. The present inventors have conducted a further research and found that the method for fixing a resin tube to a die according to the present disclosure can suppress such a deviation.

An embodiment of the present disclosure will be described in detail below with reference to the attached drawings. In the attached drawings, structures having the same functions are denoted by the same reference numerals and descriptions thereof are sometimes skipped.

Resin-Tube Fixing Device

FIGS. 1A and 1B are schematic views of an example of a resin-tube fixing device 101 that carries out a method for fixing a resin tube. FIG. 1A is a side view of the resin-tube fixing device 101, and FIG. 1B is a front view of the resin-tube fixing device 101. The resin-tube fixing device 101 can be used to manufacture a resin-tube covered roller including a cylindrical or columnar base, an elastic layer containing rubber and provided on a peripheral surface of the base, and a surface layer formed by a resin tube configured to cover a peripheral surface of the elastic layer.

The resin-tube fixing device 101 includes fixing jigs 104 configured to fix a cylindrical die 102 so that the axis of the die 102 extends in the vertical or substantially vertical direction. The fixing jigs 104 pinch an upper end portion and a lower end portion of the die 102. FIGS. 1A and 1B illustrate a state in which a resin tube 103 is inserted in the die 102.

The die 102 is a cylindrical die whose center portion in a radial cross section is cut through. In consideration of deformation during a manufacturing process and deformation due to heating, the die 102 is suitably formed of a stainless steel material.

The size of the die 102 can be appropriately designed according to the size of a resin-tube covered roller to be manufactured.

Outer peripheral surfaces of end portions of the die 102 may be inclined so that the resin tube 103 is smoothly folded back. Further, the outer peripheral surface of the die 102 may be subjected to mechanical treatment or chemical treatment so that the resin tube 103 rarely comes off.

The resin tube 103 is a cylindrical tube, and the size of the resin tube 103 can be appropriately selected according to the size of the resin-tube covered roller to be manufactured. Also, the thickness of the resin tube 103 can be appropriately selected so that the thickness of a resin tube layer in the resin-tube covered roller becomes a desired value.

On upper and lower sides of the die 102, moving units 105 configured to fix the resin tube 103 are attached to a main body of the resin-tube fixing device 101. Each moving unit 105 can be moved in the axial direction of the die 102 (up-down direction in FIGS. 1A and 1B) by rotating a handle 107. The moving unit 105 may be moved in the up-down direction under control of an air cylinder or a stepping motor, instead of using the handle 107.

While the moving unit 105 is disposed on each of the upper and lower sides of the die 102 in the resin-tube fixing device 101 illustrated in FIGS. 1A and 1B, it may be disposed only on the upper side or the lower side of the resin-tube fixing device 101. While the die 102 is disposed so that the axial direction thereof coincides with the vertical or substantially vertical direction in the embodiment, the axial direction of the die 102 is not limited to the vertical direction.

Hereinafter, the operation of the moving units 105 and the fixing method for the resin tube 103 will be described with reference to the lower moving unit 105.

The moving unit 105 includes a diameter expanding unit 201 and a pressing member 301.

Figure 3A:
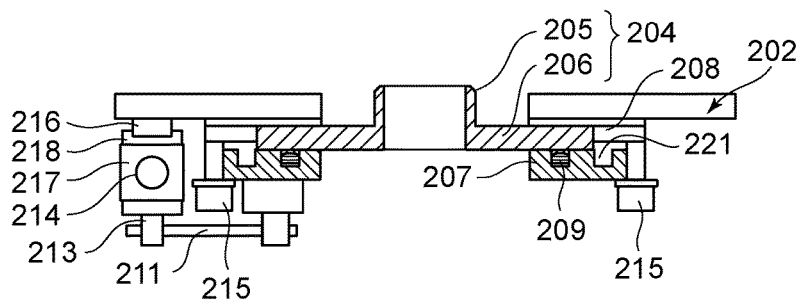
FIG. 3A is an explanatory cross-sectional view of an example of a diameter expanding mechanism.
Figure 3B:
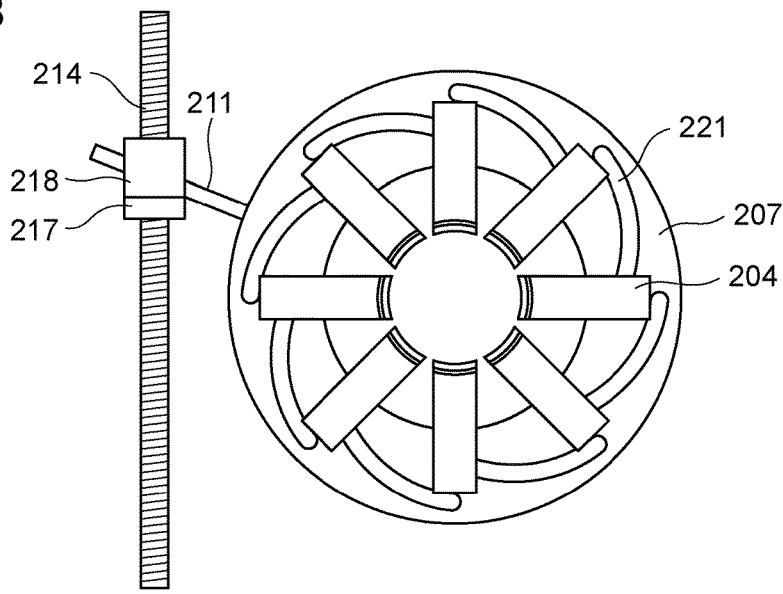
FIG. 3B is an explanatory plan view of the diameter expanding mechanism.

FIGS. 3A and 3B are a cross-sectional view and a top view, respectively, of the diameter expanding unit 201 and surrounding members. The diameter expanding unit 201 includes a plurality of diameter expanding members 204 arranged substantially concentrically. The diameter expanding members 204 are held between a rotating plate 207 and a groove member 208 fixed to a back surface of a stage 202.

Figure 2B:
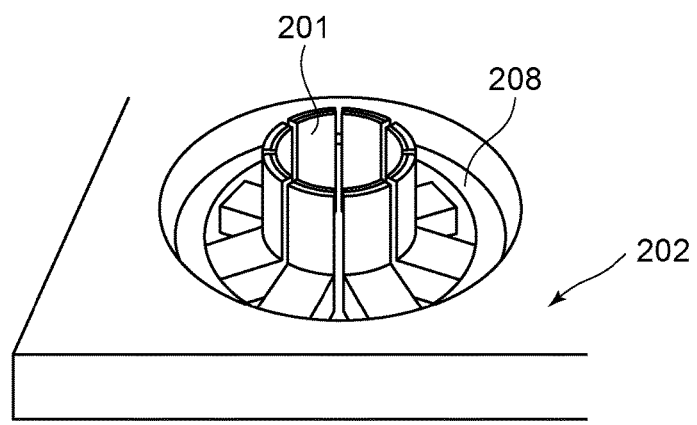
FIG. 2B is an explanatory perspective view illustrating a state in which the diameter expanding members illustrated in FIG. 2A are inserted in a through hole of a stage.

FIG. 2A is a perspective view of the diameter expanding unit 201. Each of the diameter expanding members 204 is an L-shaped member having a diameter expanding claw 205 extending in the axial direction (up-down direction in FIGS. 1A and 1B) orthogonal to the radial direction and a slide portion 206. As illustrated in FIG. 2B, the diameter expanding unit 201 is inserted in a through hole provided in the center of the stage 202 fixed to the moving unit 105.

Figure 4:
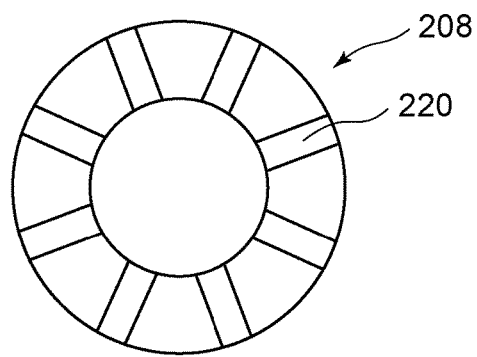
FIG. 4 is an explanatory view of a back surface of a groove component.

Cam followers 209 are attached to a back surface of the slide portion 206, and are slidably fitted in arc-shaped cam grooves 221 provided in an upper surface of the rotating plate 207. Also, slide portions 206 are fitted in straight grooves 220 provided in a back surface of the groove member 208. FIG. 4 is a back view of the groove member 208. The groove member 208 is a ring-shaped flat plate, and has eight straight grooves 220 radially extending in its back surface.

Figure 3C:
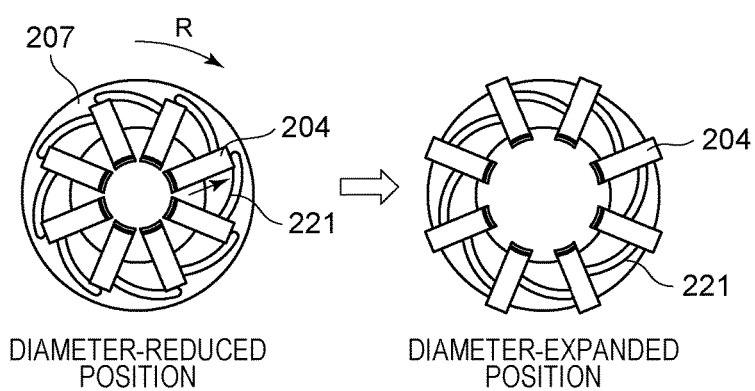
FIG. 3C is an explanatory view illustrating operation of the diameter expanding mechanism.

FIG. 3C includes top views of the rotating plate 207 and the diameter expanding unit 201. When the rotating plate 207 is rotated in a direction of arrow R, the cam followers 209 roll in the corresponding cam grooves 221, and the diameter expanding members 204 move from a diameter reduced position to a diameter expanded position along the straight grooves 220 in the back surface of the stage 202. At the diameter reduced position, the diameter expanding unit 201 can be inserted in the resin tube 103. When the diameter expanding members 204 move to the diameter expanded position, the resin tube 103 can be extended in the radial direction so that the inner diameter (diameter) of the resin tube 103 becomes larger than the outer diameter (diameter) of the die 102. The direction of the center axis of the diameter expanding unit 201 nearly coincides with the axial direction of the die 102, and the diameter expanding unit 201 can concentrically expand the diameter of the resin tube 103.

The rotating plate 207 is supported by four or more presser pins 215 under the groove member 208, and can rotate in the horizontal direction on almost the same axis as the center axis of the diameter expanding unit 201. The rotating plate 207 can be rotated by rotating a diameter expanding handle 106. When the diameter expanding handle 106 is rotated, a nut 217 moves along a screw 214. The nut 217 is provided with a fixing jig 218. Along with movement of the nut 217, the fixing jig 218 moves along a guide member 216 disposed nearly parallel to and above the screw 214. A conversion shaft 213 is attached below the fixing jig 218. Straight movement of the fixing jig 218 is converted into rotational movement of the rotating plate 207 via the conversion shaft 213 and a rotating rod 211 fixed at a distal end to the rotating plate 207. The rotating plate 207 may be rotated under control of an air cylinder or a stepping motor, instead of using the diameter expanding handle 106.

The inner diameter (diameter) of the diameter expanding unit 201 is appropriately designed to be smaller than the inner diameter of the resin tube 103 so that the diameter expanding unit 201 can be inserted in the die 102 having the resin tube 103 therein at the diameter reduced position. At the diameter expanded position, the inner diameter of the diameter expanding unit 201 is larger than the outer diameter of the die 102.

Outer peripheral surfaces of the diameter expanding claws 205 are preferably subjected to mechanical machining to have a surface roughness Ra of 100 μm or more. When the surface roughness Ra is 100 μm or more, the resin tube 103 rarely comes off from the diameter expanding claws 205 in the diameter expanded state.

While the diameter expanding unit 201 in FIGS. 2A and 2B and 3A to 3C is composed of eight diameter expanding members 204, the number of diameter expanding members 204 is not limited thereto. The number of diameter expanding members 204 can be appropriately designed as long as it allows the diameter of the resin tube 103 to be expanded.

The pressing member 301 is attached to a stage 302 in the moving unit 105. The stage 302 can be moved in the up-down direction by rotation of a handle 108. The diameter expanding unit 201 and the pressing member 301 can operate independently.

Figure 5:
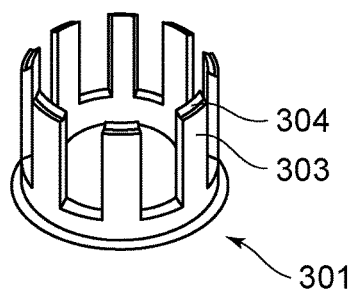
FIG. 5 is a perspective view of an example of a pressing member.

FIG. 5 is a perspective view of the pressing member 301 in the embodiment. The pressing member 301 is a cylindrical member having a plurality of pressing claws 303 nearly equally spaced on the same circumference. A depression between the pressing claws 303 can be fitted to one diameter expanding member 204 at the diameter expanded position. The pressing member 301 and the diameter expanding unit 201 are used in combination so that each pressing claw 303 is inserted between two diameter expanding members 204 in a folding process to be described later.

V-grooves 304 are provided in distal end portions of the pressing claws 303. The V-grooves 304 can grip an end surface of an end portion of the resin tube 103.

The inner diameter (diameter) of the pressing member 301 is appropriately designed so that it is larger than the outer diameter of the die 102 and so that the V-grooves 304 can grip the end surface of the end portion of the resin tube 103 in the folding process to be described later.

The number of pressing claws 303 can be designed in accordance with the number of diameter expanding claws 205. For example, when the number of diameter expanding claws 205 is eight, the number of spaces between the diameter expanding claws 205 is also eight. Therefore, the number of pressing claws 303 is preferably eight. The pressing claws 303 do not always need to be provided in correspondence with all of the spaces between the diameter expanding claws 205, and the number of pressing claws 303 may be less than eight as long as it does not impair the effects of the present embodiment.

It is desirable that the height of at least the distal ends of the pressing claws 303 is larger than the height of the distal ends of the diameter expanding claws 205 when the pressing member 301 and the diameter expanding unit 201 are fitted together.

Manufacturing Method for Resin-Tube Covered Roller

A description will be given below of a manufacturing method for a resin-tube covered roller using the above-described resin-tube fixing device 101. The present disclosure is not limited to the following method.

Fixing of Resin Tube to Die

Steps in a method for fixing the resin tube to the die will be described with reference to FIGS. 6A and 6B to 9A to 9F.

FIGS. 6A and 8A to 8F are perspective views illustrating the steps in the method for fixing the resin tube to the die. FIG. 6B is a front view of a cross section passing through the center axis of the die 102 and extending parallel to the axial direction in FIG. 6A. FIG. 7B is a front view of a cross section passing through the center axis of the die 102 and extending parallel to the axial direction in FIG. 7A. FIGS. 9A to 9F are front views of cross sections passing through the center axis of the die 102 and extending parallel to the axial direction in FIGS. 8A to 8F.

Figure 6A:
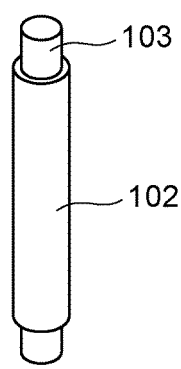
FIG. 6A is a perspective view illustrating a state in which a resin tube is inserted in a die.
Figure 6B:
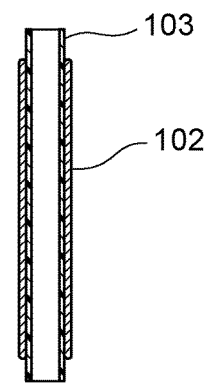
FIG. 6B is a cross-sectional view of FIG. 6A.

First, as step (a), as illustrated in FIGS. 6A and 6B, the resin tube 103 is placed inside the die 102 so that both end portions of the resin tube 103 protrude from both ends of the die 102. The length of the resin tube 103 is set so that the end portions thereof protrude outward from the die 102 in the axial direction.

After the resin tube 103 is inserted in the die 102, the die 102 having the resin tube 103 inserted therein is fixed to the fixing jigs 104 in the resin-tube fixing device 101. Alternatively, the resin tube 103 may be inserted into the die 102 fixed to the resin-tube fixing device 101.

Next, as a step (b), end portions of the resin tube 103 are folded back onto an outer peripheral surface of the die 102 by the following resin-tube folding method (folding process).

Figure 7A:
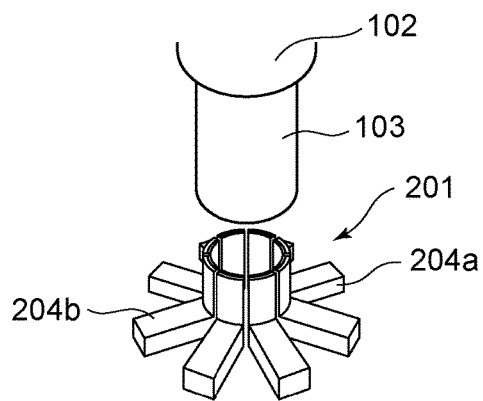
FIG. 7A is an explanatory view illustrating a state in which a diameter expanding unit is disposed at an end portion of the resin tube.
Figure 7B:
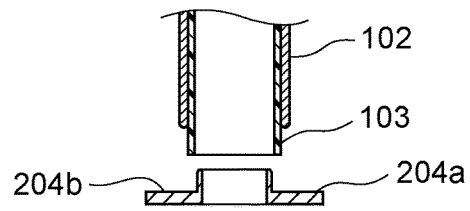
FIG. 7B is a cross-sectional view of FIG. 7A.

First, as illustrated in FIGS. 7A and 7B, the diameter expanding unit 201 is placed so that the axial direction (up-down direction) in which the diameter expanding claws 205 extend is substantially parallel to the center axis of the die 102 (a first part of Step (i)).

At this time, the diameter expanding claws 205 of the diameter expanding unit 201 are at a diameter reduced position such as to allow insertion of the resin tube 103. This step includes a case in which the diameter expanding unit 201 is assembled in the resin-tube fixing device 101 beforehand so that it is substantially parallel to the center axis of the die 102.

Figure 8C:
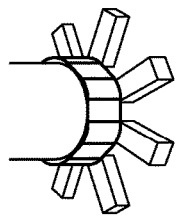
FIGS. 8A to 8F illustrate steps in a method for fixing the resin tube to the die.
Figure 8F:
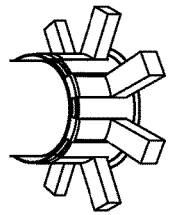
Figure 8B:
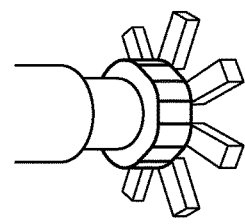
Figure 8E:
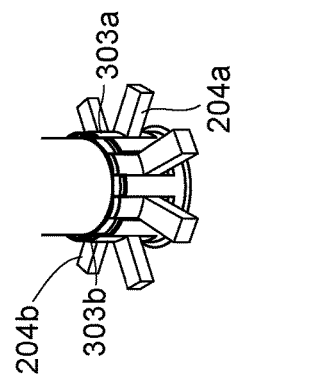
Figure 8A:
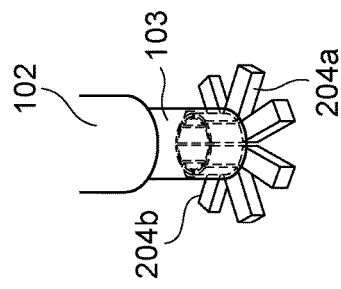

Next, as illustrated in FIG. 8A, the plural diameter expanding claws 205 at the diameter reduced position are inserted in one end portion of the resin tube 103 protruding from the end portion of the die 102 (a second part of the step (i)). While the diameter expanding claws 205 inserted in the resin tube 103 are visualized in FIG. 8A, they are not visible and not illustrated in FIGS. 8B to 8F showing subsequent steps.

Next, as illustrated in FIG. 8B, the diameter of the one end portion of the resin tube 103 is expanded by moving the diameter expanding claws 205 to the diameter expanded position so that the inner diameter of the one end portion of the resin tube 103 becomes larger than the outer diameter of the die 102 (a third part of the step (i)).

Specifically, the diameter expanding claws 205 are gradually moved from the diameter reduced position to the diameter expanded position by rotating the diameter expanding handle 106. When the diameter expanding handle 106 is rotated, the outer peripheral surfaces of the diameter expanding claws 205 come into contact with an inner surface of the resin tube 103, and the diameter of the resin tube 103 is expanded as the diameter defined by the diameter expanding claws 205 increases.

At this time, depending on the type of the resin tube 103, tension is applied to the resin tube 103 when increasing the diameter of the resin tube 103 starts. Hence, the resin tube 103 inside the die 102 is sometimes pulled and slightly deviated. For this reason, the diameter of the resin tube 103 is expanded while relatively moving the diameter expanding unit 201 to approach the other end portion of the resin tube 103 so that tension is not applied to the resin tube 103. Specifically, the diameter of the resin tube 103 is expanded while rotating the handle 107 to lift up the stage 202 and the diameter expanding unit 201.

Next, as illustrated in FIG. 8C, the diameter expanding unit 201 and the die 102 are moved relative to each other while keeping the one end portion of the resin tube 103 in the diameter expanded state by the diameter expanding claws 205 so that the diameter expanding unit 201 approaches the other end portion of the resin tube 103. Then, the one end portion of the resin tube 103 is folded back while keeping the one end portion of the resin tube 103 in the diameter expanded state by the diameter expanding claws 205 so that the outer peripheral surface of the die 102 is opposed to at least a part of the outer peripheral surface of the one end portion of the resin tube 103 (Step (ii)).

Specifically, the stage 202 on which the diameter expanding claws 205 at the diameter expanded position are mounted is lifted by rotating the handle 107 to move up the diameter expanding unit 201 to a position where the positions of the distal ends of the diameter expanding claws 205 exceed the height of the end surface of the die 102.

This step includes a case in which relative movement of the resin tube 103 and the die 102 is stopped at the time when the one end portion of the resin tube 103 is folded back so that the outer peripheral surface of the die 102 is opposed to at least a part of the outer peripheral surface of the one end portion of the resin tube 103.

The resin tube 103 can be fixed to the die 102 with tension by increasing the lift amount of the diameter expanding unit 201 to increase the push-up length of the resin tube 103 in the state in which the position of the upper end portion of the resin tube 103 is fixed.

Next, a pressing force in a direction toward the other end portion of the resin tube 103 is applied to the end surface of the one end portion of the resin tube 103 kept in the diameter expanded state by the diameter expanding claws 205, the diameter expanding claws 205 are disengaged from the one end portion of the resin tube 103, and the one end portion of the resin tube 103 is shifted to the outer peripheral surface of the die 102 (Step (iii)). Specifically, this step is performed through the following procedure.

Figure 8D:
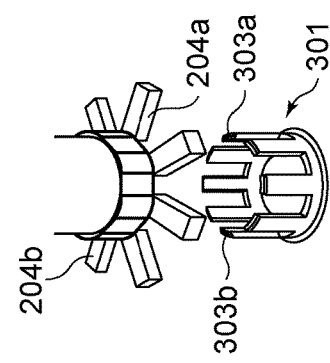
Figure 9A:
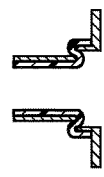
FIGS. 9A to 9F are cross-sectional views illustrating the steps of FIGS. 8A to 8F.
Figure 9B:
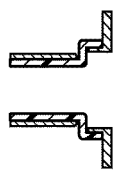
Figure 9C:
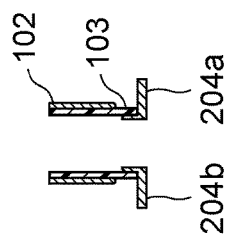
Figure 9D:
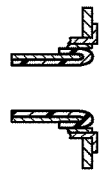
Figure 9E:
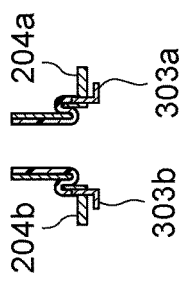
Figure 9F:
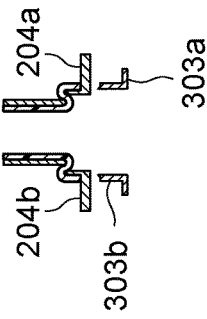

First, as illustrated in FIG. 8D, the pressing member 301 is placed so that the axial direction (up-down direction in FIG. 8D) in which the pressing claws 303 extend is substantially parallel to the center axis of the die 102 (a first part of Step (iii)). This step also includes a case in which the pressing member 301 is assembled in the resin-tube fixing device 101 beforehand so as to be substantially parallel to the center axis of the die 102.

Next, as illustrated in FIG. 8E, the pressing claws 303 extending in the direction substantially parallel to the extending direction of the diameter expanding claws 205 are inserted between the diameter expanding claws 205 at the diameter expanded position, and the distal ends of the pressing claws 303 are brought into contact with the end surface of the one end portion of the resin tube 103 (a second part of Step (iii)). For easy understanding of the relationship among the resin tube 103, the diameter expanding members 204, and the pressing claws 303, in the cross-sectional view of FIG. 9E, a diameter expanding member 204a is illustrated on the front side of a pressing claw 303a, and a diameter expanding member 204b is illustrated on the rear side of a pressing claw 303b (this also applies to FIG. 9F).

Specifically, the stage 302 is lifted by the handle 108 to move up the pressing claws 303 until the V-grooves 304 at the distal ends of the pressing claws 303 grip the end surface of the resin tube 103.

Next, as illustrated in FIG. 8F, the pressing member 301 and the die 102 are moved relative to each other so that the pressing member 301 approaches the other end portion of the resin tube 103, the diameter expanding claws 205 are disengaged from the one end portion of the resin tube 103, and the one end portion of the resin tube 103 is shifted to the outer peripheral surface of the die 102 (a third part of the step (iii)).

Specifically, the stage 302 is lifted to move up the pressing member 301 until the distal ends of the pressing claws 303 reach a position higher than the distal ends of the diameter expanding claws 205, and the resin tube 103 is removed from the diameter expanding claws 205. As a result, the end portion of the resin tube 103 is folded back in contact with the outer peripheral surface of the die 102, and the resin tube 103 is fixed to the end portion of the die 102. To prevent the folded resin tube 103 from slipping, an annular band, such as an O-ring, may be attached beforehand at a position on the outer periphery of the die 102 with which the folded resin tube 103 is to contact.

Finally, the diameter expanding unit 201 and the pressing member 301 are moved down.

By similarly performing the above-described procedure for the upper end portion of the resin tube 103, the cylindrical die 102 can be manufactured in which the inner peripheral surface is covered with the resin tube 103 and the end portions of the resin tube 103 are folded back and fixed. The lower end portion of the resin tube 103 may be folded back after the upper end portion is folded back and fixed.

The upper end portion and the lower end portion of the resin tube 103 can be folded back simultaneously.

In the above-described method for fixing the resin tube to the die, the resin tube 103 and the diameter expanding claws 205 are disengaged by the pressing member 301. Hence, the length in which the resin tube 103 is pushed up by the diameter expanding claws 205 in Step (ii) can be reduced. For this reason, the extension amount of the resin tube 103 inside the die 102 is limited, and the resin tube 103 rarely deviates inside the die 102.

Manufacture of Resin-Tube Covered Roller

In a hollow portion of the die 102 thus manufactured and having the inner peripheral surface covered with the resin tube 103, a base is fixed to be substantially concentric with the die 102. The base is cylindrical or columnar.

Specifically, cap members are set at the end portions of the cylindrical die 102 having the base to keep the die 102 in a sealed state. To more reliably maintain the sealed state of the die 102, annular bands like O-rings can be disposed on either the surface of the die 102 or the surfaces of the cap members in the fitting portions to the cap members. This suppresses leakage of the poured material, and makes it possible to withstand the increase in internal pressure during heating.

Then, an elastic layer is formed by pouring an uncured material in a cavity between the inner peripheral surface of the resin tube 103 and the outer peripheral surface of the base and curing the poured uncured material. An example of the uncured material is an uncured liquid silicone rubber.

According to the aspect of the present disclosure, when the resin tube is fixed to the cylindrical die by folding back the end portions of the resin tube onto the outer peripheral surface of the die, the surface of the resin tube can be prevented from being scratched by rubbing against the inner peripheral surface of the die owing to deviation of the resin tube.

According to another aspect of the present disclosure, it is possible to obtain the method for fixing the resin tube to the die and the manufacturing method for the resin-tube covered roller.

EXAMPLES

A manufacturing method for a resin-tube covered roller will be described below by using an electrophotographic roller as an example. The present disclosure is not limited to the following examples.

First Example

A first example provides an example of a manufacturing method for a resin-tube covered roller having an outer diameter of 30 mm and a length of 330 mm to be used in electrophotography.

As a die 102, a cylindrical die formed of stainless steel and having an outer diameter of 40 mm, an inner diameter of 30.2 mm, and a total length of 370 mm was produced.

For an electrophotographic roller, a resin tube 103 is suitably formed of fluorine-based resin. As the resin tube 103, a PFA tube having an inner diameter of 29.5 mm, a thickness of 0.050 mm, and a length of 440 mm was prepared.

As a diameter expanding unit 201, the following member was prepared. An upper surface of a column having an outer diameter of 76 mm and a height of 7 mm and a bottom surface of a column having an outer diameter of 22 mm and a height of 15 mm were coaxially joined to form a composite body, and a through hole having a diameter of 20 mm and having the same axis as that of the composite body was bored. The composite body was radially divided from the center axis into eight members having a width of 8 mm along cutting lines, when viewed from above. The surface roughness Ra of outer peripheral surfaces of diameter expanding claws 205 was made 100 µm or more by mechanical treatment.

A rotating plate 207 was subjected to arc-shaped grooving so that the diameter expanding unit 201 stopped at a diameter expanded position and a diameter reduced position. The outer diameter defined by the diameter expanding claws 205 in the diameter expanding unit 201 was 26 mm at the diameter reduced position and 47 mm at the diameter expanded position. By rotating the rotating plate 207 45°, the diameter expanding unit 201 can be moved from the diameter reduced position to the diameter expanded position.

A pressing member 301 was such that the height of distal ends of pressing claws 303 was 3 mm higher than the height of distal ends of the diameter expanding claws 205 when fitted to the diameter expanding unit 201. The outer diameter and the inner diameter defined by the pressing claws 303 were 47 mm and 42 mm, respectively. In distal end portions of the pressing claws 303, V-grooves 304 having a depth of 1.5 mm were formed.

These members were mounted in a resin-tube fixing device 101, and an electrophotographic roller was manufactured by the above-described manufacturing method for the resin-tube covered roller.

First, a PFA tube was inserted in the die 102 to protrude by 35 mm from both end portions of the die 102. Then, the die 102 in which the PFA tube was inserted was fixed at a fixed position in the center of the resin-tube fixing device 101.

Next, a lower moving unit 105 in the resin-tube fixing device 101 was moved up to a position, where an end surface of an end portion of the PFA tube came into contact with upper surfaces of slide portions 206 of the diameter expanding unit 201, by rotating a handle 107.

Next, the rotating plate 207 was rotated by rotating a diameter expanding handle 106, and the diameter expanding claws 205 were opened to expand the diameter of the PFA tube.

Next, the moving unit 105 was lifted by rotating the handle 107 again to move up the diameter expanding unit 201 to a position at a height of 15 mm from the end portion of the die 102.

Next, the pressing member 301 was moved up by rotating a handle 108, and the pressing claws 303 were put between the diameter expanding claws 205 of the diameter expanding unit 201. When the pressing member 301 was continuously moved up, the end surface of the end portion of the PFA tube was fitted in the V-grooves 304 at the distal ends of the pressing claws 303. After that, the PFA shifted onto the outer peripheral surface of the die 102 while disengaging from the diameter expanding claws 205. When the pressing member 301 was then moved up to a position at a height of 3 mm from the end surface of the end portion of the die 102, the PFA tube was removed from the diameter expanding claws 205, and was fixed to the outer peripheral surface of the die 102 in a folded state.

The above-described operations were similarly performed for an upper end portion of the PFA tube, and the upper end portion of the PFA tube was also fixed to the outer peripheral surface of the die 102.

After the pressing member 301 was moved down to its initial position, the moving unit 105 was moved down to its initial position, and the die 102 to which the PFA tube was fixed was taken out from the resin-tube fixing device 101.

Next, a base was set inside the taken die 102 to be centered on the axis of the die 102, and a cap was fitted to one end portion of the die 102. Then, a liquid rubber material was poured into a cavity in the die 102, and a cap was fastened to the other end portion of the die 102. The liquid rubber material was cured by heating to form an elastic layer of an electrophotographic roller.

Through visual observation, the surface of the PFA tube of the produced electrophotographic roller was found not to be scratched.

Second Example

A second example provides an example of a manufacturing method for a resin-tube covered roller having an outer diameter of 25 mm and a length of 330 mm and used in electrophotography.

As a die 102, a cylindrical die formed of stainless steel and having an outer diameter of 35 mm, an inner diameter of 25.2 mm, and a total length of 370 mm was produced.

For an electrophotographic roller, a resin tube 103 is suitably formed of fluorine-based resin. As the resin tube 103, a PFA tube having an inner diameter of 24.5 mm, a thickness of 0.050 mm, and a length of 440 mm was prepared.

As a diameter expanding unit 201, the following member was prepared. An upper surface of a column having an outer diameter of 82 mm and a height of 7 mm and a bottom surface of a column having an outer diameter of 19 mm and a height of 15 mm were coaxially joined to form a composite body, and a through hole having an inner diameter of 8 mm and having the same axis as that of the composite body was bored. The composite body was radially divided from the center axis into eight members having a width of 8 mm along cutting lines, when viewed from above. The surface roughness Ra of outer peripheral surfaces of diameter expanding claws 205 was made 100 µm or more by mechanical treatment.

A rotating plate 207 was subjected to grooving so that the diameter expanding unit 201 stopped at a diameter expanded position and a diameter reduced position. The outer diameter defined by the diameter expanding claws 205 in the diameter expanding unit 201 was 20 mm at the diameter reduced position and 44 mm at the diameter expanded position. By rotating the rotating plate 207 45°, the diameter expanding unit 201 can be moved from the diameter reduced position to the diameter expanded position.

A pressing member 301 was such that the height of distal ends of pressing claws 303 was 3 mm higher than the height of distal ends of the diameter expanding claws 205 when fitted to the diameter expanding unit 201. The outer diameter and the inner diameter defined by the pressing claws 303 were 42 mm and 37 mm, respectively. In distal end portions of the pressing claws 303, V-grooves 304 having a depth of 1.5 mm were formed.

Subsequently, an electrophotographic roller was manufactured similarly to the first example. Through visual observation, the surface of the PFA tube in the manufactured electrophotographic roller was found not to be scratched.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-214974, filed Oct. 30, 2015, which is hereby incorporated by reference herein in its entirety.

What is claimed is:

1. A method for fixing a resin tube inserted in a cylindrical die to the die, comprising:
    (a) placing the resin tube inside the cylindrical die so that both end portions of the resin tube protrude from both ends of the die; and
    (b) folding back the end portions of the resin tube protruding from the both ends of the die onto an outer peripheral surface of the die,
    wherein step (b) includes the following steps (i), (ii), and (iii):
    (i) providing a diameter expanding unit having a plurality of diameter expanding claws which are movable in a radial direction between a diameter reduced position to be insertable in the resin tube and a diameter expanded position to extend the resin tube so that an inner diameter of the resin tube is larger than an outer diameter of the die, and which extend in an axial direction orthogonal to the radial direction;
    placing the diameter expanding unit so that the axial direction is substantially parallel to a center axis of the die;
    inserting the diameter expanding claws at the diameter reduced position into one end portion of the resin tube protruding from one of the ends of the die; and
    moving the diameter expanding claws to the diameter expanded position to expand a diameter of the one end portion of the resin tube so that an inner diameter of the one end portion is larger than the outer diameter of the die;
    (ii) moving the diameter expanding unit and the die relative to each other so that the diameter expanding unit approaches the other end portion of the resin tube while keeping the one end portion of the resin tube in a diameter expanded state by the diameter expanding claws; and
    (iii) applying a pressing force toward the other end portion of the resin tube to an end surface of the one end portion of the resin tube; disengaging the one end portion of the resin tube kept in the diameter expanded state with the diameter expanding claws from the diameter expanding claws; and shifting the one end portion of the resin tube onto the outer peripheral surface of the die.

2. The method for fixing the resin tube according to claim 1,
    wherein step (iii) includes:
    inserting a plurality of pressing claws extending in a direction substantially parallel to the axial direction between the diameter expanding claws at the diameter expanded position and bringing distal ends of the pressing claws into contact with the end surface of the one end portion of the resin tube; and
    moving the pressing claws and the die relative to each other so that the pressing claws approach the other end portion of the resin tube to shift the one end portion of the resin tube onto the outer peripheral surface of the die.

3. The method for fixing the resin tube according to claim 1, wherein, in step (i), diameter expansion of the resin tube is performed while relatively moving the diameter expanding unit so that the diameter expanding unit approaches the other end portion of the resin tube.

4. The method for fixing the resin tube according to claim 1, wherein, in step (iii), the relative movement is stopped at a time when the one end portion of the resin tube is folded back so that the outer peripheral surface of the die is opposed to at least a part of an outer peripheral surface of the one end portion of the resin tube while the one end portion of the resin tube is kept in the diameter expanded state by the diameter expanding claws.

* * * * *